Figure 1:
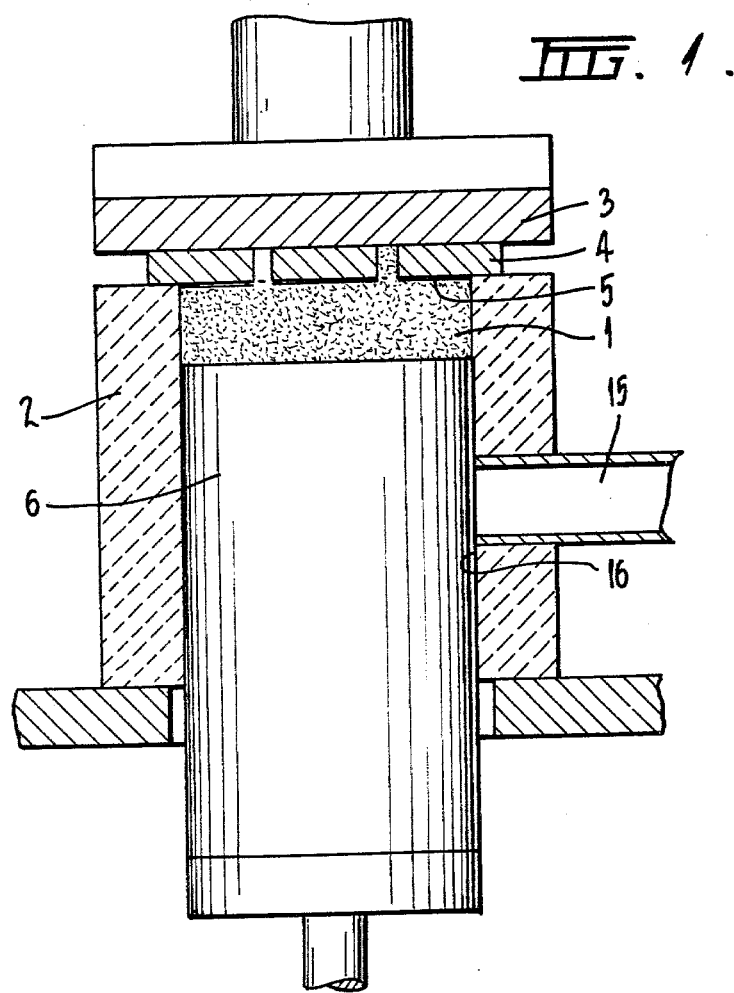

United States Patent [19]

Kalnins

[11] 4,252,513
[45] Feb. 24, 1981

[54] PROCESS FOR CURING THERMOSETTING RESINS AND ELASTOMERS

[75] Inventor: John Z. Kalnins, Seaford, Australia
[73] Assignee: McPhersons Limited, Melbourne, Australia
[21] Appl. No.: 937,705
[22] Filed: Aug. 29, 1978

Related U.S. Application Data

[62] Division of Ser. No. 720,418, Sep. 3, 1976, abandoned.
[51] Int. Cl.³ .............................................. B29C 3/00
[52] U.S. Cl. .................................. 425/126 R; 264/27; 264/DIG. 46; 425/127; 425/174.6; 425/256; 425/451.7
[58] Field of Search ................. 425/126 R, 174.6 R, 425/256, 451.7; 264/27, DIG. 46

[56] References Cited

U.S. PATENT DOCUMENTS

| | | | |
|---|---|---|---|
| 2,416,427 | 2/1947 | Bonawit | 264/DIG. 46 |
| 2,509,652 | 5/1950 | Rushmer | 264/27 |
| 2,681,769 | 6/1954 | Simenson | 425/256 X |
| 3,239,403 | 3/1966 | Williams | 156/275 |
| 3,795,473 | 3/1974 | Holik | 425/126 X |
| 3,905,735 | 9/1975 | Thomas | 425/256 |

FOREIGN PATENT DOCUMENTS 2102722  8/1972  Fed. Rep. of Germany ........ 425/451.7

OTHER PUBLICATIONS

Rubber Age, Nov. 1942, pp. 133–134, F. L. Yerzley, "Vulcanization or Other Heat Treatment by Electrical Conduction."

Primary Examiner—Thomas P. Pavelko
Attorney, Agent, or Firm—Sherman & Shalloway

[57] ABSTRACT

The present invention relates to methods for shaping compositions comprising materials containing at least one electrically conductive material, dispersed in substantially non-electrically conductive plastic materials selected from thermosetting resins, thermoplastic resins and elastomers. With thermosetting resins, shaping is accompanied by curing.

9 Claims, 2 Drawing Figures

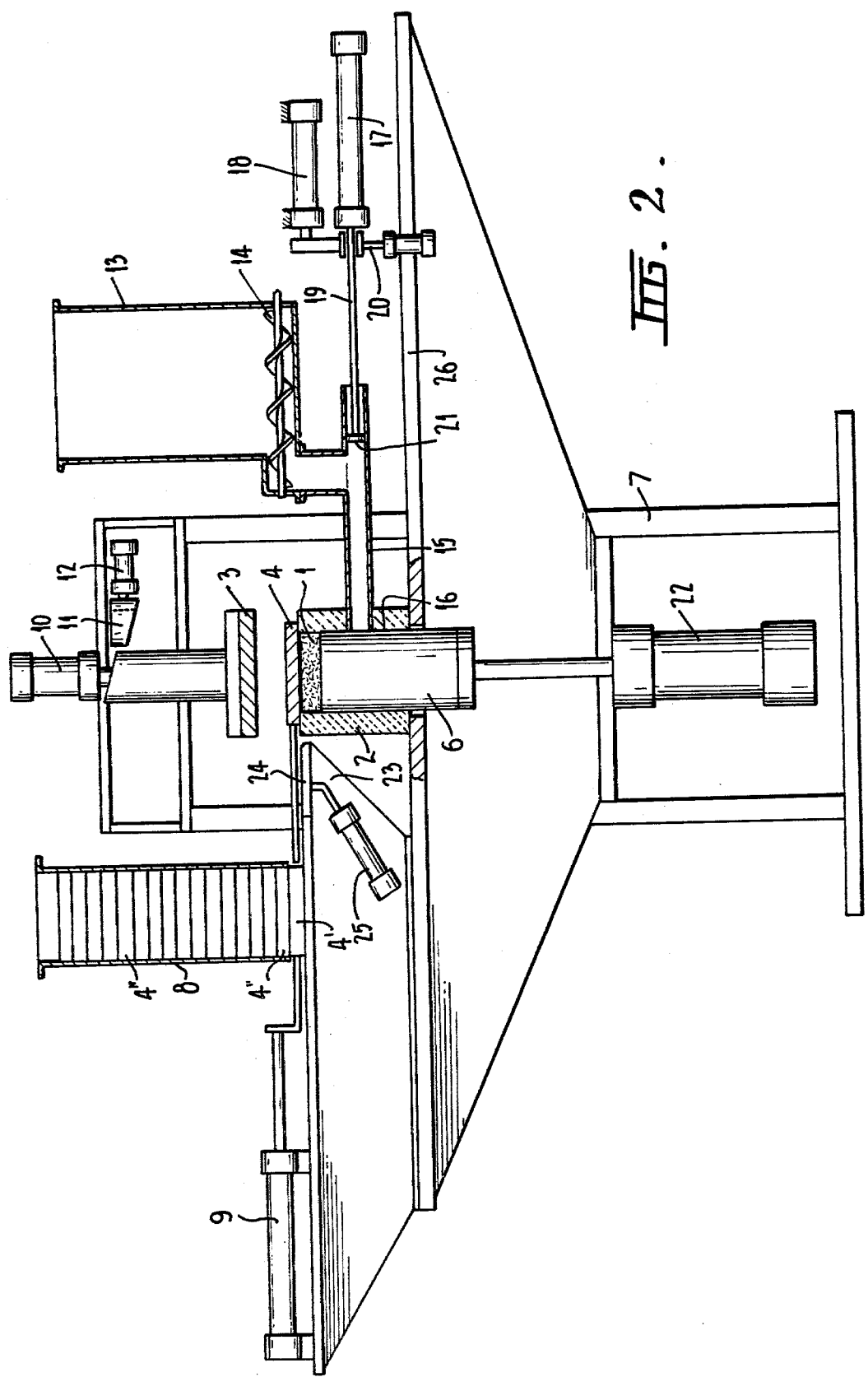

PROCESS FOR CURING THERMOSETTING RESINS AND ELASTOMERS

This is a division of Application Ser. No. 720,418, filed Sept. 3, 1976 now abandoned.

BACKGROUND OF THE INVENTION

In conventional methods used for the purpose of shaping and curing thermosetting resins, either with or without electrically conductive materials, partial or complete shaping and curing is carried out by applying heat externally to the composition to be processed. External heat may be applied by the use of electrically, steam, oil or gas heated elements or platens and the material to be cured is confined in a press or die which is also used to shape or compact the material to the required dimensions.

In some methods at least a part of the heat may be generated by transferring the material from a central source, by the application of an external force, via channels connected to various cavities of final dimensions. The friction between the material and the transfer channel walls generates additional heat, thus speeding up the curing reaction.

These methods are generally not altogether satisfactory. Uniform heating of the composition is difficult because of the fact that the resins exhibit poor heat conducting characteristics.

In contrast to the above methods, wherein heat is applied externally, the present invention is directed to the generation of heat within the material itself by a method which ensures uniform heating.

To this end, the present invention provides a method of shaping a composition comprising at least one material including at least one electrically conductive material, dispersed in a substantially non-electrically conductive plastic material selected from thermosetting resins, thermoplastic resins and elastomers; which method comprises (a) introducing the composition into a die or like shaping device, and (b) passing an electrical current through the composition within the shaping device to thereby effect resistance heating and shaping of the composition. It is to be appreciated that the electrical current may be AC or DC and may be direct or induced.

The passage of an electrical current through the composition results in resistance heating which enables shaping (and in some instances curing) to be carried out.

Resistance heating results in the raising of the temperature of the composition at a uniform rate throughout in contrast to conventional method where uniformity is restricted by thermal conductivity. On a microscopic scale, the points of heat generation within the material occur at the most advantageous locations, i.e. at the interfaces between the conductive and non-conductive materials. As a result of heating uniformly throughout the material, the process enables the time scale to be reduced to such a point that it is possible, for a brief time, to reach higher temperatures than can be applied in conventional methods which depend on heat conduction. This allows achievement of a high level of cure without the time being sufficient to cause excessive decomposition and damage to the end properties. Another important factor is that in some cases post-curing, a more or less compulsory step with some products in prior art methods, may be dispensed with.

Conveniently, the composition to be shaped is confined and optionally compressed in the cavity of a die made of electrically insulating material or materials. The die may be heated or cooled depending upon each material formulation and its end use.

Conveniently, the current can be applied to the composition by means of electrodes. These are preferably placed so as to give uniform heating through the composition. However, any pair or multiples of pairs may be connected to different power sources having different potential and current values, the values and the actual connecting network being specific for each shape and/or formulation and the end product requirements.

The actual form of the electrodes is not essential to the invention but is determined by the shape of the end product. The electrodes may take the form of two electrically conductive plates placed on opposite sides of the material. They can also take the form of segment elements placed around the material to be cured.

The actual voltage or current required to heat and cure the composition will naturally be determined by the resistance of the composition itself and the end use requirements.

Depending on the final properties required, and to assist in the achievement of a sound product, the current may be applied in interrupted or uninterrupted fashion. Also, the current may be varied or pulsed throughout the curing cycle, ranging for example from a few amperes to 500 amperes.

The control of the process can conveniently be achieved by monitoring the energy input in terms of watt-seconds thereby making the process independent of variations that occur in resistance from batch or batch or during the curing cycle itself.

For some material compositions or products, it is advantageous to have the conductive electrodes controlled within a specified temperature range. This temperature range will be specific for each material composition or formula. One temperature range found to be particularly satisfactory, however, is from 0° C. to 500° C. The heating of the electrodes facilitates flow of the material into cavities, promotes effective bonding in products where the composition is to be bonded with a previously applied adhesive to a metal backing, minimises moisture condensation and also assists in clean separation of the composition from the electrodes.

Whether or not compression is necessary will depend on the composition itself, the shape and the end use of the finished product. Pressure applied to the composition may vary from no pressure at all to several tons per square inch.

The compositions cured and shaped by the process of the present invention have a variety of end uses. For instance, they may be used in the manufacture of friction materials for use in brakes, clutches and the like, and they may also be used in the manufacture of anti-friction materials for use in solid bearings and machinery slide plates, or of moulded thermosetting articles such as knife handles, plastic gears and household equipment handles. Of particular interest is the area of friction materials manufacture.

A preferred embodiment of the invention will now be described by way of example only with reference to the accompanying drawings in which:

FIG. 1 illustrates a cross-sectional side elevation of part of an apparatus used in the process of the invention for the formation of an automotive disc pad comprising a friction material bonded both by an adhesive and mechanically to a metal backing plate; and FIG. 2 illustrates a cross-sectional side elevation of the whole of the apparatus of FIG. 1.

Referring to FIG. 1, the friction material composition 1, typically in dry powder form, is introduced into the cavity of a die 2, the amount of composition being controlled volumetrically or by weighting. The die 2 consists of electrically non-conductive material. A top electrode 3, which is heated and in the form of a platen, is in contact with a metal backing plate 4, precoated with adhesive 5, to which the composition is to be bonded. A bottom electrode 6 in the form of a piston or punch is adapted to reciprocate in the die to compress the material. The operation consists of filling the die, closing with the punch, and then passing electric current between the electrodes to simultaneously compress and cure the composition into the desired shape and also bond it to the backing plate.

Turning next to FIG. 2, the die-electrode-punch assembly of FIG. 1 is mounted on a tool support structure 26 which in turn is attached to the main press frame 7 enabling the material to be compressed between the punch 6 and the top platen 3, which also acts as the two electrodes for the passage of current between the material 1. Further metal backing plates 4', 4", etc are held in a magazine 8 and fed in position using cylinder 9. The top platen 3 is movable to close the die cavity and to allow ejection of the finished moulding, and is actuated by cylinder 10 which is locked in position by wedge 11 and cylinder 12. The cylinder 10 exerts a relatively light pressure so as not to transfer the main pressing load to the tool support structure 26 for the tooling, and it is only when moulding takes place and after the locking of wedge 11 that a substantial force is carried by the press structure. At no time, however, is a heavy force carried by the structure 26.

A material storage hopper 13 contains the composition which is fed by a screw feeder 14 into the entrance of compacting cavity 15 connected to the die 2. The compacting cavity 15 is closed off by the side wall 16 of the punch 6 during the curing cycle, and while this is happening an air actuated ramming cylinder 17 reciprocates to compact material in the compacting cavity until it has reached an adequate predetermined volume for the next operation which involves transfer of a measured amount into the die cavity. The forward stroke of the ramming cylinder 17, being limited by the material in the cavity 15, actuates a limit switch (not shown) through a time delay to indicate a sufficient volume has been achieved. A clamp 20 grips the rod 19 of the cylinder 17, and a hydraulic cylinder 18 is actuated to move the platen 21 at the forward end of rod 19 forward through a fixed displacement set by limit switches on the cylinder 18. This results in a measured volume of compacted material being transferred to the die cavity after which cylinder 22 moves the punch 6 upwards to compress the material to be moulded against the backing plate 4 under the platen 3.

The platen 3 may be heated so that the backing plate 4 is brought up to sufficient temperature to allow better adhesion of the moulded material 1 by the adhesive 5. During compression an electric current is passed between the punch 6 and the platen 3, typically using DC with the current level controlled and pulsed according to the requirements of the curing operation and the properties of the material being moulded. At the conclusion of the resistance curing cycle, the upper platen 3 opens after removal of the wedge 11 by cylinder 12 and the punch 6 follows through to eject the finished moulding above the surface of the die 2.

The cylinder 9 is still in the forward position after loading the backing plate 4' used in this curing cycle and the transfer fingers attached to its pusher are still engaging the backing plate. The cylinder 9 now moves backwards, gripping the finished moulding which is discharged through the chute 23 adjacent to the moulding and discharges through the trapdoor 24 opened by cylinder 25.

While the compression portion of the moulding cycle was taking place, the next charge of material was being compacted by the ramming cylinder 17 as described earlier, and after ejection of the finished moulding the cycle is repeated with another backing plate being loaded, closing of the upper platen 3 and then transfer again of the next compacted charge to the moulding cavity.

The same general procedure could be used for other types of brake elements where the friction material is also bonded to a metal backing plate. Likewise, anti-friction materials for sliding and wear-resistant applications may be similarly cured and, if desired, simultaneously bonded to a backing plate.

The use of a steel backing plate to conduct current from one electrode is not of course essential to the process. Segments for drum brakes, for example, may be produced between two or more electrodes with the friction material being entirely separable from these electrodes after completion of the cycle.

The following represents an example of a composition for use as a friction element:

|  | By Weight |
|---|---|
| Asbestos | 0–60% |
| Resin (thermosetting) | 0–60% |
| Copper powder or fibres | 0–75% |
| Iron powder or fibres | 0–75% |
| Zinc powder or fibres | 0–75% |
| Graphite | 0–50% |
| Carbon black | 0–50% |
| Barytes | 0–80% |
| Calcite | 0–50% |

The composition could also include moisture and gas scavengers and other commonly used friction modifiers such as silica powder or zircon powder.

A more specific composition, suitable for use as a friction element, is as follows:

|  | By Weight |
|---|---|
| 6D Asbestos | 16.1% |
| Iron powder | 29.5% |
| Copper powder | 14.8% |
| Barytes | 6.0% |
| Phenolic resin | 12.1% |
| Zircon powder | 6.0% |
| Graphite | 15.6% |
|  | 100.0% |

As stated previously the present invention may also be applied to thermosetting moulding materials and an example of such a composition is as follows:

|  | By Weight |
|---|---|
| Thermosetting resin | 5–80% |

-continued

|  | By Weight |
|---|---|
| Carbon black (conductive) | 5-80% |
| Cotton or asbestos fibres | 0-50% |

Other commonly used modifying materials may also be included, examples being kaolin, wood flour, nut shell powders.

The method can also be used for some elastomeric compositions such as rubber products which are modified to provide sufficient conductivity to allow heating by electrical resistance. Rubbers are not sufficiently conductive of themselves but conductive material can be added to the composition.

The following represents a typical composition of this type.

|  | By Weight |
|---|---|
| Elastomer | 10-90% |
| Carbon black (conductive) | 0-70% |
| Zinc oxide | 0-20% |
| Antioxidant | 0-5% |
| Crosslinking ingredients | 0-5% |
| Various accelerators | 0-5% |

We claim:

1. Apparatus for shaping a friction or antifriction material formed from a mixture of a substantially non-electrically conducting thermosetting material composite with at least one particulate electrically conductive material uniformly dispersed throughout said mixture, said apparatus comprising:
   (a) an electrically insulated mold cavity adapted to receive said mixture;
   (b) a piston member reciprocable within said mold cavity arranged to close off a first side of said mold cavity;
   (c) a platen member arranged to close off a second side of said mold cavity opposed to said first side whereby a confined space is defined by said mold cavity, said piston member and said platen member;
   (d) means for metering a predetermined quantity of the mixture from a supply of said mixture and for introducing said predetermined quantity of said mixture into a confined region of said mold cavity at a position between said piston member and said platen member;
   (e) electrode means carried by said piston member and said platen member arranged to establish an electrical connection with said mixture confined within said mold cavity;
   (f) means for applying an electric potential to said electrode means to pass an electric current substantially throughout said mixture confined within said mold cavity to thereby effect resistance heating, shaping and curing of said mixture within the mold cavity; and
   (g) means for moving said piston member in a reciprocable manner within said mold cavity and through said mold cavity after shaping of said mixture to thereby remove said shaped mixture from the mold cavity.

2. The apparatus according to claim 1 wherein said means for introducing a predetermined quantity of said mixture into said mold cavity comprises a storage hopper, a compacting cavity connected to the mold cavity by a passage normally closed by a side wall of said piston member when said piston member is in a position compressing a previously introduced quantity of said mixture, feed means for delivering said mixture from said storage hopper into said compacting cavity, a first reciprocatable ram means arranged to compact said mixture in said compacting cavity, sensing means arranged to sense when a forward limit of movement of said ram means reaches a position indicative that said predetermined quantity of said mixture has been delivered to said compacting cavity, and a second ram means arranged to move said first ram means forwardly when said piston member opens said passage means to introduce said predetermined quantity of said mixture into said mold cavity.

3. The apparatus according to claim 1 wherein said electrode means are segmented such that a plurality of adjacent pairs of electrodes are arranged on either side of said mold cavity and said means for applying an electric potential to said electrode means includes means for applying differing potentials to said adjacent pairs of electrodes.

4. The apparatus according to claim 1 further comprising means for positioning a metal backing plate between said platen member and said mold cavity, said platen member having heating means arranged to heat said metal backing plate.

5. The apparatus according to claim 4 wherein said means for positioning a metal backing plate comprises a magazine for supporting a substantially vertical stack of said metal backing plates and a feed device for moving a lowermost one of said backing plates to a position overlying said mold cavity.

6. The apparatus according to claim 1 further comprising actuating means for moving said platen member towards and away from a position closing off said second side of said mold cavity, and a movable locking wedge arranged to selectively lock said actuating means at said position where the platen member closes off said second side of the mold cavity.

7. The apparatus according to claim 24 wherein said means for reciprocating said piston member comprises ram means arranged to provide a compressive force to said mixture confined within said mold cavity against said platen member when it is locked by said locking wedge, and to eject said shaped and cured mixture from said second side of the mold cavity upon movement of said platen member away therefrom.

8. The apparatus according to claim 1 wherein said means for applying an electric potential to said electrode means includes means for varying or pulsing the electric current in said mixture within the mold cavity.

9. The apparatus according to claim 27 wherein said means for applying an electric potential to said electrode means is such that a direct current flow results in said mixture within the mold cavity.

* * * * *